United States Patent
Makino

(10) Patent No.: US 9,205,760 B2
(45) Date of Patent: Dec. 8, 2015

(54) ELECTRIC VEHICLE HAVING INDEPENDENT TRACTION MOTOR UNITS

(71) Applicant: NTN CORPORATION, Osaka (JP)

(72) Inventor: Tomoaki Makino, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/375,499

(22) PCT Filed: Jan. 18, 2013

(86) PCT No.: PCT/JP2013/050912
§ 371 (c)(1),
(2) Date: Jul. 30, 2014

(87) PCT Pub. No.: WO2013/114969
PCT Pub. Date: Aug. 8, 2013

(65) Prior Publication Data
US 2015/0012158 A1 Jan. 8, 2015

(30) Foreign Application Priority Data

Jan. 30, 2012 (JP) .................................. 2012-016163

(51) Int. Cl.
*B60L 3/00* (2006.01)
*B60L 15/20* (2006.01)
(Continued)

(52) U.S. Cl.
CPC . *B60L 15/20* (2013.01); *B60K 1/02* (2013.01); *B60K 6/46* (2013.01); *B60K 7/0007* (2013.01); *B60L 11/1803* (2013.01); *B60L 15/025* (2013.01); *B60L 15/2009* (2013.01); *B60L 15/2036* (2013.01); *B60W 10/08* (2013.01); *B60W 10/18* (2013.01); *B60W 10/20* (2013.01);

*B60K 2001/0416* (2013.01); *B60K 2007/0038* (2013.01); *B60K 2007/0092* (2013.01);
(Continued)

(58) Field of Classification Search
None
See application file for complete search history.

(56) References Cited

U.S. PATENT DOCUMENTS

2004/0102884 A1* 5/2004 Tange et al. ...................... 701/48
2011/0281684 A1* 11/2011 Ushiroda et al. ............... 475/331

FOREIGN PATENT DOCUMENTS

JP          9-84215       3/1997
JP      2005-160262       6/2005
(Continued)

OTHER PUBLICATIONS

PCT International Preliminary Report on Patentability mailed Aug. 14, 2014 in corresponding International Patent Application No. PCT/JP2013/050912.
(Continued)

*Primary Examiner* — Adam Alharbi

(57) ABSTRACT

An electric vehicle to automatically adjust output torque during travelling even when there is a difference in the output characteristic between two traction motor units that independently drive left and right drive wheels. The electric vehicle includes the motor units; a torque command unit that outputs torque command values to the motor units; a torque difference occurrence determiner that determines that a difference has occurred between actual driving forces TL, TR of the respective drive wheels even when the torque command unit applies the same torque command values TL*, TR* to the motor units; and a driving force difference reducer that, if the determiner determines that a driving force difference not less than a set value has occurred between the drive wheels, causes control of reducing the driving force difference to be performed during travelling.

8 Claims, 4 Drawing Sheets

(51) Int. Cl.
  *B60K 6/46* (2007.10)
  *B60W 10/08* (2006.01)
  *B60K 7/00* (2006.01)
  *B60L 11/18* (2006.01)
  *B60L 15/02* (2006.01)
  *B60K 1/02* (2006.01)
  *B60W 10/18* (2012.01)
  *B60W 10/20* (2006.01)
  *B60K 1/04* (2006.01)

(52) U.S. Cl.
  CPC .......... *B60L2210/40* (2013.01); *B60L 2220/12* (2013.01); *B60L 2220/14* (2013.01); *B60L 2220/44* (2013.01); *B60L 2220/46* (2013.01); *B60L 2240/12* (2013.01); *B60L 2240/24* (2013.01); *B60L 2240/423* (2013.01); *B60L 2240/461* (2013.01); *B60L 2250/10* (2013.01); *B60L 2250/16* (2013.01); *B60L 2250/26* (2013.01); *B60W 2710/083* (2013.01); *B60W 2720/30* (2013.01); *Y02T 10/6217* (2013.01); *Y02T 10/643* (2013.01); *Y02T 10/648* (2013.01); *Y02T 10/7005* (2013.01); *Y02T 10/7241* (2013.01); *Y02T 10/7275* (2013.01)

(56) References Cited

FOREIGN PATENT DOCUMENTS

| | | |
|---|---|---|
| JP | 2006-258289 | 9/2006 |
| JP | 2007-43837 | 2/2007 |

OTHER PUBLICATIONS

International Search Report mailed Apr. 16, 2013, in corresponding International Patent Application No. PCT/JP2013/050912.

\* cited by examiner

ELECTRIC VEHICLE HAVING INDEPENDENT TRACTION MOTOR UNITS

CROSS REFERENCE TO THE RELATED APPLICATION

This application is a U.S. National Stage Application of PCT/JP2013/050912, filed Jan. 18, 2013, and claims foreign priority benefit to Japanese Patent Application No. 2012-016163, filed Jan. 30, 2012, the entire disclosure of which is herein incorporated by reference as a part of this application.

BACKGROUND OF THE INVENTION

1. Field of the Invention

The present invention relates to an electric vehicle including two traction motor units that independently drive left and right drive wheels, respectively.

2. Description of Related Art

Among electric vehicles, there is a single-motor type electric vehicle in which a drive from a single traction motor unit is transmitted to left and right drive wheels via a differential gear, and there is also an electric vehicle including two traction motor units that independently drive left and right drive wheels, respectively. Examples of the type including individual left and right traction motor units include an in-wheel motor type (e.g., see Patent Document 1) and an on-board type in which each traction motor unit is mounted in a vehicle body and a drive therefrom is transmitted via a drive transmission member such as a constant velocity joint.

PRIOR ART DOCUMENT

Patent Document

[Patent Document 1] JP Laid-open Patent Publication No. 2006-258289

SUMMARY OF THE INVENTION

In the type including individual traction motor units that independently drive left and right drive wheels, respectively, size reduction and weight reduction are achieved, but there are the following problems. The torque output characteristic of each traction motor unit is affected by manufacturing accuracy and assembling accuracy of a motor rotor and a motor stator, a level of compatibility/adjustment with an inverter that controls the traction motor unit, or the like. In addition, a difference may occur between the torque output characteristics of the left and right traction motor units due to aging of each traction motor unit.

Thus, in the case where one vehicle is driven with left and right two traction motor units, even if a driver wishes the same torque for the two traction motor units, that is, even if the driver performs such a steering operation as to cause the vehicle to travel straight, a difference in output torque may occur between the left and right traction motor units. If amounts of output torque of the respective left and right traction motor units are significantly different from each other, a difference occurs between a vehicle behavior intended by the driver and an actual vehicle behavior, so that the driver feels uncomfortable. In addition, the problem also arises that correction of a vehicle operation by the driver may be required.

An object of the present invention is to provide an electric vehicle that allows an output torque to be automatically adjusted during travelling of the vehicle even when there is a difference in output characteristic between two traction motor units which independently drive left and right drive wheels, respectively, that allows sufficient vehicle travel performance to be obtained even if manufacturing and assembling accuracy of motor components or a level of compatibility with an inverter unit is relatively low, and that allows the manufacturing cost of each traction motor unit to be reduced. The general aspects of the present invention will now be described using the reference signs in the figures showing embodiments of the present invention.

An electric vehicle according to the present invention is a four-wheel or three-wheel electric vehicle including two traction motor units 6, 6 configured to independently drive left and right drive wheels 2, respectively, and includes: a torque command unit 23 configured to output torque command values TL*, TR* for driving the two traction motor units 6, 6, respectively; a motor driver 22 configured to drive the respective traction motor units 6, 6 in accordance with the torque command values TL*, TR* provided by the torque command unit 23; a torque difference occurrence determiner 31 configured to determine that a difference has occurred between actual driving forces TL, TR of the respective left and right drive wheels 2 even when the torque command unit 23 applies the same torque command values TL*, TR* to the two traction motor units 6, 6; and a driving force difference reducer 32 configured to, if the torque difference occurrence determiner 31 determines that a driving force difference equal to or greater than a set value has occurred between the left and right drive wheels 2, cause control of reducing the driving force difference to be performed during travelling of the vehicle.

An operation of the above configuration will be described. In order for the vehicle to travel straight, the torque command unit 23 applies the same torque command values TL*, TR* to the two traction motor units 6, 6. The torque difference occurrence determiner 31 performs a determination as to a state where a difference has occurred between the actual driving forces TL, TR of the respective left and right drive wheels 2, 2 even when the torque command unit 23 applies the same torque command values TL*, TR* to the two traction motor units 6, 6 as described above, that is, performs a determination as to whether a driving force difference has occurred and as to to what extent the driving force difference has occurred. If the torque difference occurrence determiner 31 determines that a driving force difference equal to or greater than the set value has occurred between the left and right drive wheels 2, the driving force difference reducer 32 causes control of reducing the driving force difference to be performed during travelling of the vehicle. The control of reducing the driving force difference is, for example, control of increasing the driving force TL or TR of the traction motor unit 6 having a smaller driving force, reducing the driving force of the traction motor unit 6 having a greater driving force, or performing both.

Thus, even when there is a difference in torque output characteristic between the two traction motor units 6, 6 which independently drive the respective left and right drive wheels 2, the output torque can be automatically adjusted during travelling of the vehicle. As a result, even if manufacturing and assembling accuracy of the motor components or a level of compatibility with the inverter unit is relatively low, sufficient vehicle travel performance can be obtained, and thus the manufacturing cost of the traction motor units 6, 6 can be reduced. In addition, even when the motor output characteristic changes due to a reason such as aging, stable vehicle travel performance can be maintained.

In the present invention, the electric vehicle may further include a steering angle detector 15 configured to detect a steering angle θs of a steering device 12 and a steering torque detector 19 configured to detect a steering torque Ts applied to the steering device 12. The torque difference occurrence determiner 31 may determine that a difference has occurred between the actual driving forces TL, TR of the respective left and right drive wheels 2 even when the same torque command values TL*, TR* are applied, based on information of the torque command values TL*, TR* applied from the torque command unit 23 to the two traction motor units 6, 6, a braking signal B actuating a brake 16, the steering angle θs, and the steering torque Ts. The steering torque detector 19 may directly detect the steering torque Ts, or may indirectly detect the steering torque Ts from the current in a turning motor 14 or the like as described later.

Even when the steering angle θs is at a neutral position for intending straight traveling, if a driving force difference has occurred between the left and right drive wheels 2, a steering torque Ts is transmitted such that a steering wheel 13 of the steering device 12 rotates due to a load acting on wheels 3, 3 from a road surface. Thus, a state where a difference has occurred between the actual driving forces TL, TR of the respective left and right drive wheels 2, 2 can be detected based on the steering angle θs and the steering torque Ts. When the steering angle θs is at the neutral position and the steering torque Ts is low to such a degree that the steering torque Ts can be regarded as zero, it can be determined that no difference has occurred between the driving forces TL, TR. On the other hand, even when the steering angle θs is at the neutral position, if a steering torque Ts that is high to some extent is generated, a state where a difference has occurred between the driving forces TL, TR can be detected, and to what extent the driving forces TL, TR difference has occurred can also be detected. During operation of the brake 16, there are many variations in how the steering torque Ts occurs, and thus automatic adjustment is not preferred. Therefore, a state where a difference has occurred between the actual driving forces TL, TR of the respective left and right drive wheels 2 even when the same torque command values TL*, TR* are provided, can be determined by the torque difference occurrence determiner 31 based on the information of the torque command values TL*, TR* applied to the two traction motor units 6, 6, the braking signal B, the steering angle θs, and the steering torque Ts.

It is to be noted that it is very difficult to directly detect the actual driving forces TL, TR of the respective left and right drive wheels 2 caused by the respective traction motor units 6, 6. Even if a motor current is measured, the actual driving forces TL, TR may deviate depending on the motor output characteristic. When strain of a shaft is detected by a strain sensor or the like, the actual driving forces TL, TR can be detected. However, in terms of wiring or a space for mounting the sensor, it is not practical to provide the strain sensor to the rotational shaft and extract its output. In contrast, the torque difference occurrence determiner 31 determines a driving force difference based on the information of the torque command values TL*, TR*, the braking signal B, the steering angle θs, and the steering torque Ts, and thus can appropriately perform the determination of a driving force difference between the left and right wheels with a simple configuration.

Specifically, when the torque difference occurrence determiner 31 has determined that the same torque command values TL*, TR* are applied from the torque command unit 23 to the two traction motor units 6, 6; has determined that the brake 16 is in a non-actuated state based on the braking signal B; and has determined that the steering angle θs is at a steering neutral position based on the information of the steering angle θs, if the steering torque Ts is equal to or higher than a threshold, the torque difference occurrence determiner 31 may determine that a difference has occurred between the actual driving forces TL, TR of the respective left and right drive wheels 2. As described above, when the steering angle θs is at the steering neutral position and the steering torque Ts is high to some extent, it is in a state where a difference has occurred between the driving forces TL, TR of the respective left and right drive wheels 2. Therefore, by determining that it is in a state where a difference has occurred between the actual driving forces TL, TR of the respective left and right drive wheels 2 if the steering torque Ts at that time is equal to or higher than the threshold, an appropriate determination can be performed.

Other than the above configuration, when the torque difference occurrence determiner 31 has determined that the same torque command values TL*, TR* are applied from the torque command unit 23 to the two traction motor units 6, 6; and has determined that the brake 16 is in a non-actuated state based on the braking signal B, if the torque difference occurrence determiner 31 determines that the steering torque Ts is transmitted such that the steering wheel 13 of the steering device 12 rotates due to a load acting on the wheels 3, 3 from a road surface, based on the steering torque Ts detected by the steering torque detector 19; and determines the steering angle θs is increased from the steering neutral position, the torque difference occurrence determiner 31 may determine that a difference has occurred between the actual driving forces TL, TR of the respective left and right drive wheels 2.

If a difference has occurred between the actual driving forces TL, TR of the respective left and right drive wheels 2, the steering torque Ts is transmitted due to a load acting on the wheels from the road surface and the steering angle θs is increased from the steering neutral position. Thus, also by the torque difference occurrence determiner 31 determining that a difference has occurred between the actual driving forces TL, TR of the respective left and right drive wheels 2, 2 if the torque difference occurrence determiner 31 determines that the steering torque Ts is transmitted and determines that the steering angle θs is increased from the steering neutral position, an appropriate determination can be performed.

In the present invention, in case of including a turning device 10 configured to be driven or auxiliarily driven by the turning motor 14, the steering torque detector 19 may obtain the information of the steering torque Ts by converting a current of the turning motor 14. When the steering angle θs is at the neutral position, if a driving force difference has occurred between the left and right drive wheels 2, 2, the torque of the turning motor 14 is increased due to a load acting on the wheels 3, 3 from the road surface. The torque of the turning motor 14 can be obtained from the current thereof. As a result, the information of the steering torque Ts is obtained by converting the current in the turning motor 14, and thus the information of the steering torque Ts can be obtained with a simple configuration in which an ammeter and a converter are merely provided.

In the present invention, an alarm unit 33 may be provided which is configured to output an alarm giving notice to a driver if: the torque difference occurrence determiner 31 determines that a difference has occurred between the actual driving forces TL, TR of the respective left and right drive wheels 2 even when the same torque command values TL*, TR* are applied to the two traction motor units 6, 6; and the driving force difference is equal to or greater than a threshold. The alarm is outputted, for example, through displaying of characters, pictographs, or the like on a screen of a display 34, a spoken message, or the like.

If a difference has occurred between the driving forces TL, TR of the two traction motor units 6, 6 during straight travelling, and the difference is great, there is the possibility that some kind of a problem has occurred, and it is preferred to perform maintenance such as re-adjustment, repair, replacement, or the like of the traction motor units 6, 6 or a motor drive circuitry even when appropriate travelling is enabled under control of the driving force difference reducer 32 at the moment. When an alarm is outputted by the alarm unit 32, the driver is allowed to know the problem and to perform maintenance early.

In the present invention, each of the traction motor units 6, 6 may be an in-wheel motor. In addition, each of the traction motor units 6, 6 may be mounted in a vehicle body 1, and a drive therefrom may be transmitted to the drive wheel 2 via a drive transmission member.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
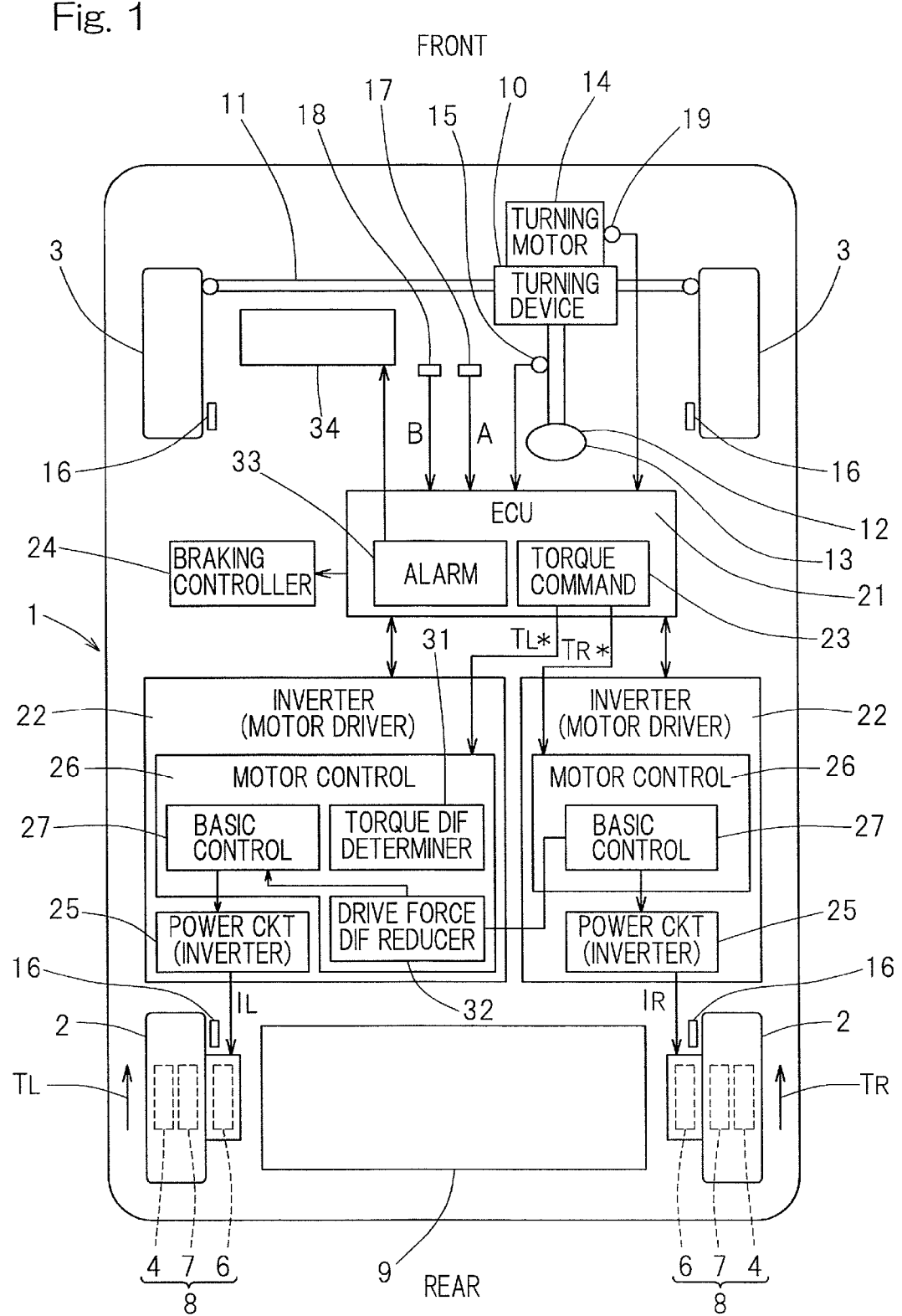
FIG. 1 is a block diagram of a schematic configuration of an electric vehicle, as viewed in a plan view, according to an embodiment of the present invention.

An embodiment of the present invention will now be described in connection with FIG. 1 to FIG. 6. The electric vehicle such as shown in FIG. 1 may be a four-wheel vehicle that includes a vehicle body 1 with left and right rear wheels 2 and left and right front wheels 3, with the rear wheels 2 being drive wheels and the front wheels 3 being driven wheels. The front wheels 3 are steered wheels. The left and right drive wheels 2, 2 are driven by respective independent in-wheel type traction motor units 6. Rotation of each traction motor unit 6 is transmitted via a reducer unit 7 and a rotational ring of a wheel bearing unit 4 to the drive wheel 2. The traction motor unit 6, the reducer unit or reduction gear 7, and the wheel bearing unit 4 are integrally assembled with each other to form an in-wheel motor drive system 8. The motor unit 6 may include a three-phase synchronous motor such as an IPM (Interior Permanent Magnet) synchronous motor. The reducer unit 7 may be a cycloidal reducer. In each in-wheel motor drive system 8, the traction motor unit 6 is disposed near the drive wheel 2, and the in-wheel motor drive system 8 is partly or entirely disposed within the drive wheel 2. Each drive wheel 2 is equipped with a brake 16. A battery 9 is used for driving the motor units 6 and as a power source for an entire electrical system of the vehicle.

A turning device 10 is a mechanism that turns the wheels 3, which are steered wheels, by laterally displacing a turning shaft 11. The turning device 10 is configured as an electric power steering type in which rotation of a steering wheel 13 of a steering device 12 is transmitted with assistance of a turning motor 14 and is converted to linear reciprocating movement of the turning shaft 11.

The steering device 12 is equipped with a steering angle detector 15 configured to detect a steering angle θs which is a rotational angle of the steering wheel 13; and a steering torque detector 19 configured to detect a steering torque Ts applied to the steering wheel 13. In the example under discussion, the steering torque detector 19 is composed of an ammeter configured to sense a current of the turning motor 14; and a converter configured to determine the steering torque Ts by converting the current sensed by the ammeter. It is to be noted that the turning device 10 may be a type in which the steering wheel 13 is mechanically separated from the turning shaft 11 and turning is performed by movement of the turning shaft 11 only with driving of the turning motor 14, namely, a so-called steer-by-wire type.

A control system will be discussed. The vehicle body 1 is equipped with: a main ECU (also referred to as VCU) 21 which is an electronic control unit configured to perform general integrated control and cooperative control of the vehicle; and two inverter units 22 each configured to perform control of each traction motor unit 6 according to commands from the ECU 21. Each inverter unit 22 is a "motor driver" recited in the claims. The two inverter units 22 may be disposed away from each other or may be provided in a common housing or on a common circuit board. The ECU 21 may include a computer, programs that may be executed by the computer, and various electronic circuits. A common computer or electrical circuitries on a common board may form light current systems for the ECU 21 and the inverter units 22.

The ECU 21 may include a torque command unit 23 that is configured to generate an accelerating/decelerating command in the form of torque command values TL*, TR*, which will influence the traction motor units 6, 6 of the left and right wheels, based on a signal A indicating accelerator position produced from an accelerator manipulation unit 17, a braking signal B produced from a brake manipulation unit 18, a cornering command produced from a steering device 12 which is a signal indicating the steering angle θs, and to send the accelerating/decelerating command to each inverter unit 22. The accelerator manipulation unit 17 may include a pedal such as an accelerator pedal and a sensor configured to sense the depression of the accelerator pedal. The brake manipulation unit 18 may include a pedal such as a brake pedal and a sensor configured to sense the depression of the brake pedal. A decelerating command produced from the brake manipulation unit 18 is sent via the ECU 21 to a braking controller unit 24, and a braking command produced from the braking controller unit 24 is sent to the brakes 16 of the respective wheels 2, 3. In addition to the above control, the ECU 21 may have a function to control each component of the vehicle based on signals produced from various sensors such as a speed sensor, a load sensor, and a wheel rotation sensor (which are not shown) provided in the vehicle.

Each inverter unit 22 includes: a power circuitry 25 that is a power conversion circuitry provided for the corresponding traction motor unit 6; and a motor control circuitry 26 configured to control the power circuitry 25. The power circuitry 25 includes an inverter (not shown) configured to convert a DC power from the battery 9 into a three-phase AC power used to drive the motor unit 6 and also includes a PWM driver configured to control the inverter.

The motor control circuitry 26 includes a computer, programs that may be executed by the computer, and various electronic circuits. The motor control circuitry 26 includes a basic controller 27 that may generate a current command that performs controls such that the power circuitry 25 outputs a motor drive current IL or IR corresponding to the torque command value TL* or TR* produced from the torque command unit 23 of the ECU 21. The basic controller 27 may control a motor current by vector control or the like using a detection value of an angle detector (not shown) configured to detect a rotational angle of the traction motor unit 6. In addition, the motor control circuitry 26 may have a function to send and receive various signals to and from the ECU 21.

In the embodiment under discussion, in the electric vehicle having the above configuration, a torque difference occurrence determiner 31 and a driving force difference reducer 32 having the following functions are provided in the motor control circuitry 26 in the inverter unit 22. An alarm unit 33 may be provided in the ECU 21. The torque difference occurrence determiner 31 and the driving force difference reducer 32 may be provided in the ECU 21 instead of being provided in the inverter unit 22.

Figure 2:
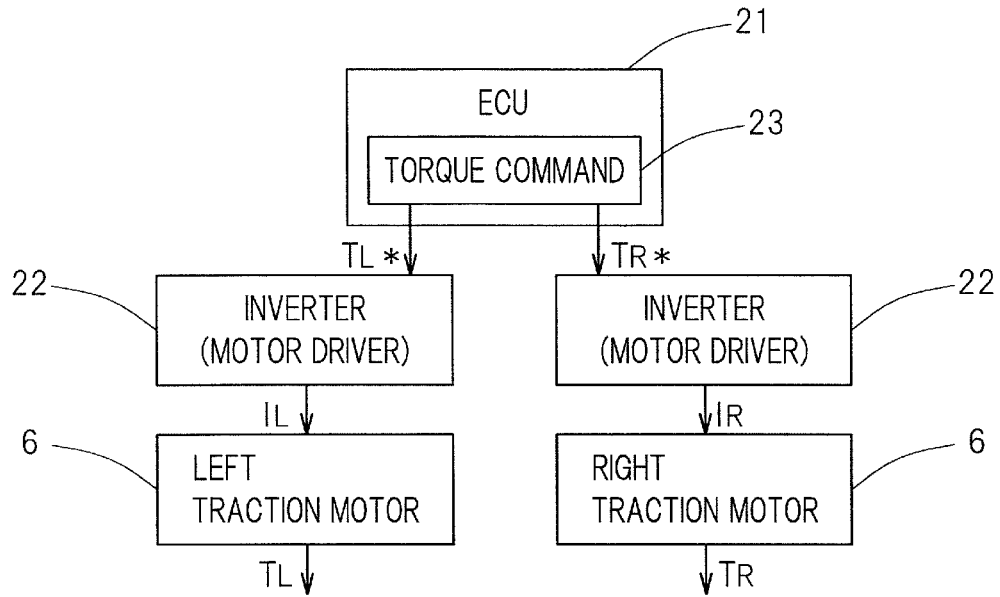
FIG. 2 is a block diagram illustrating a relationship between a torque of the electric vehicle shown in FIG. 1 and torque command values.
Figure 3:
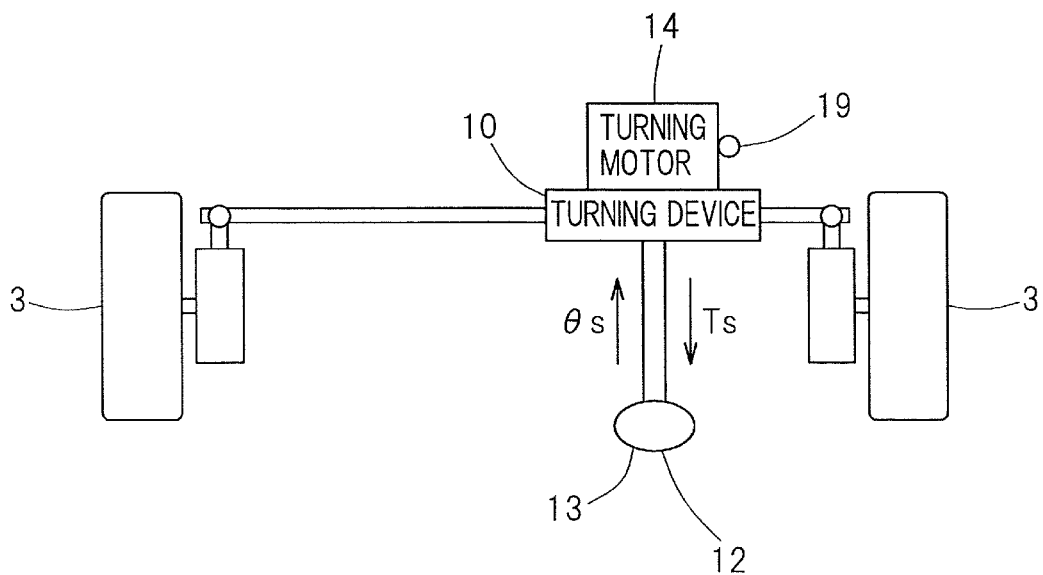
FIG. 3 is a schematic diagram illustrating a steering torque of the electric vehicle shown in FIG. 1.

Referring to FIG. 2, the torque difference occurrence determiner 31 is configured to determine that a difference has occurred between actual driving forces TL, TR of the respective left and right drive wheels 2 even when the torque command unit 23 applies the same torque command values TL*, TR* to the respective left and right two traction motor units 6, 6. The driving forces TL, TR of the respective left and right drive wheels 2 correspond to torques TL, TR outputted from the respective left and right traction motor units 6, 6 provided that transmission efficiency is not considered.

The driving force difference reducer 32 is configured to, if the torque difference occurrence determiner 31 determines that a driving force difference equal to or greater than a set value has occurred between the left and right drive wheels 2, 2, cause control of reducing the driving force difference to be performed during travelling of the vehicle. The set value may be set as appropriate by design or the like. The control of reducing the driving force difference may be control of increasing the driving force of the traction motor unit 6 having a smaller driving force, reducing the driving force of the traction motor unit 6 having a greater driving force, or performing both. Specifically, the control of reducing the driving force difference is control of adjusting the torque command values TL*, TR* provided by the torque command unit 23 of the ECU 21 to the respective inverter units 22, before the torque command values TL*, TR* are inputted to the basic controllers 27.

The driving force difference reducer 32 is provided in one of the inverter units 22 in the shown example, but may be provided over both the inverter units 22, and its adjustment function sections (not shown) configured to adjust the torque command values TL*, TR* are provided in both respective inverter units 22, 22. The driving force difference reducer 32 may be provided individually in each of the inverter units 22. Communication between configuration sections of the driving force difference reducers 32 provided in both inverter units 22, 22 or communication between the driving force difference reducer 32 and the torque difference occurrence determiner 31 in the case where the driving force difference reducer 32 is provided individually in each of the inverter units 22, 22 may be performed directly between both inverter units 22, 22 or may be performed via the ECU 21.

Specifically, the torque difference occurrence determiner 31 may be configured to determine that a difference has occurred between the actual driving forces TL, TR of the respective left and right drive wheels 2 even when the same torque command values TL*, TR* are provided, based on information of the torque command values TL*, TR* applied from the torque command unit 23 to the left and right two traction motor units 6, 6, the braking signal B actuating the brakes 16, the steering angle θs, and the steering torque Ts. The steering torque detector 19 may directly detect the steering torque Ts, or may indirectly detect the steering torque Ts from the current in the turning motor 14 or the like as described later.

Figure 4:
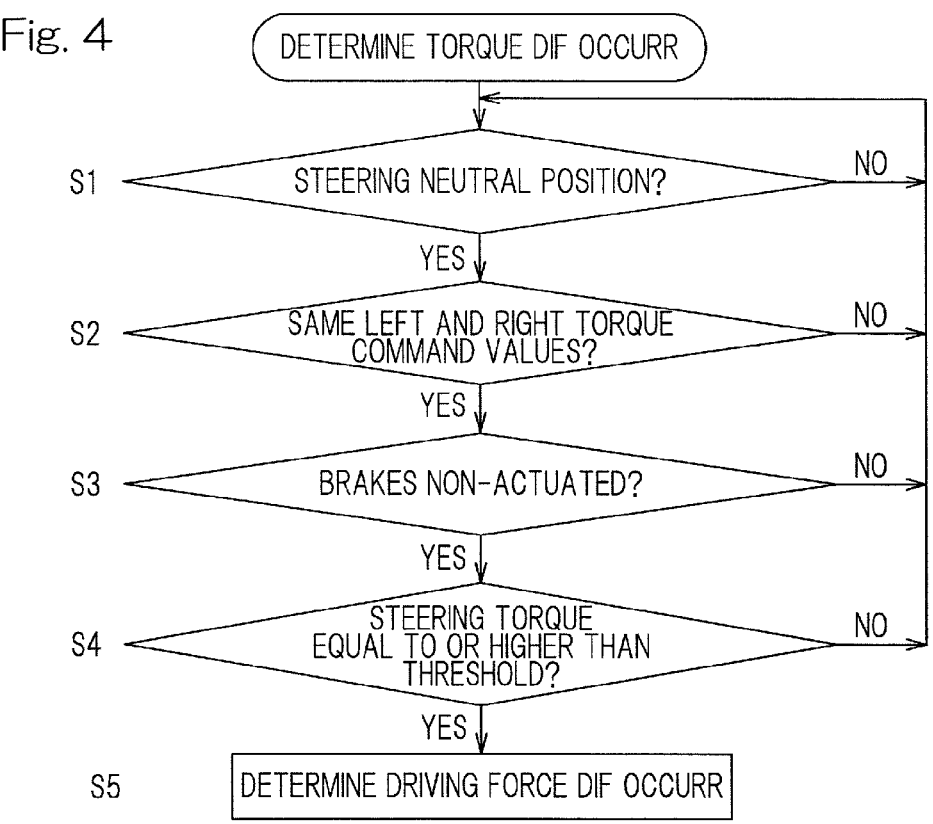
FIG. 4 is a flowchart showing an operation example of a torque difference occurrence determiner in the electric vehicle shown in FIG. 1.

More specifically, the torque difference occurrence determiner 31 may perform a process shown in FIG. 4. The process in FIG. 4 will be described with the following description of an operation. The order of respective determination steps S1 to S3 may be set as any order. The torque difference occurrence determiner 31 may be configured to perform a process shown in FIG. 5, instead of being configured as shown in FIG. 4. The process in FIG. 5 will also be described with the following description of an operation. The order of respective determination steps R1 to R4 may be set as any order.

The alarm unit 33 outputs an alarm giving notice to the driver if: the torque difference occurrence determiner 31 determines that a difference has occurred between the actual driving forces of the respective left and right drive wheels 2, 2 even when the same torque command values TL*, TR* are applied to the left and right two traction motor units 6, 6; and the driving force difference is equal to or greater than a threshold. The alarm is outputted, for example, through displaying of characters, pictographs, or the like on a screen of a display 34 provided in a console or the like at a driver seat, a spoken message from a speaker (not shown).

An operation by the above configuration will be described. In order for the vehicle to travel straight, the torque command unit 23 applies the same torque command values TL*, TR* to the two traction motor units 6, 6. The torque difference occurrence determiner 31 performs a determination as to a state where a difference has occurred between the actual driving forces TL, TR of the respective left and right drive wheels 2 even when the torque command unit 23 applies the same torque command values TL*, TR* to the left and right two traction motor units 6, 6 as described above, that is, performs determinations as to whether a driving force difference has occurred and as to to what extent the driving force difference has occurred. It is determined whether both torque command values TL*, TR* are the same, by determining whether the absolute value of the difference between both torque command values TL*, TR* is lesser than a threshold $\epsilon T$ based on which the torque command values TL*, TR* can be regarded as being the same. In other words, if $$|TL^* - TR^*| < \epsilon T,$$

it is determined that the same torque command values TL*, TR* are applied to the two traction motor units 6, 6.

As described above, if the torque difference occurrence determiner 31 determines that a driving force difference equal to or greater than the set value has occurred between the respective left and right drive wheels 2, the driving force difference reducer 32 causes control of reducing the driving force difference to be performed during travelling of the vehicle. The control of reducing the driving force difference is, for example, control of increasing the driving force TL or TR of the traction motor unit 6 having a smaller driving force, reducing the driving force of the traction motor unit 6 having a greater driving force, or performing both.

Thus, even when there is a difference in torque output characteristic between the two traction motor units 6, 6 which independently drive the respective left and right drive wheels 2, 2, the output torque can be automatically adjusted during travelling of the vehicle. As a result, even if manufacturing and assembling accuracy of the motor components or a level of compatibility with the inverter unit is relatively low, sufficient vehicle travel performance can be obtained, and thus the manufacturing cost of the traction motor units 6, 6 can be reduced. In addition, even when the motor output characteristic changes due to a reason such as aging, stable vehicle travel performance can be maintained.

Specifically, the torque difference occurrence determiner 31 determines that a difference has occurred between the actual driving forces TL, TR of the respective left and right drive wheels 2 even when the same torque command values TL*, TR* are provided, based on the information of the torque command values TL*, TR* applied from the torque command unit 23 to the two traction motor units 6, 6, the braking signal B actuating the brakes 16, the steering angle θs, and the steering torque Ts.

Figure 6:
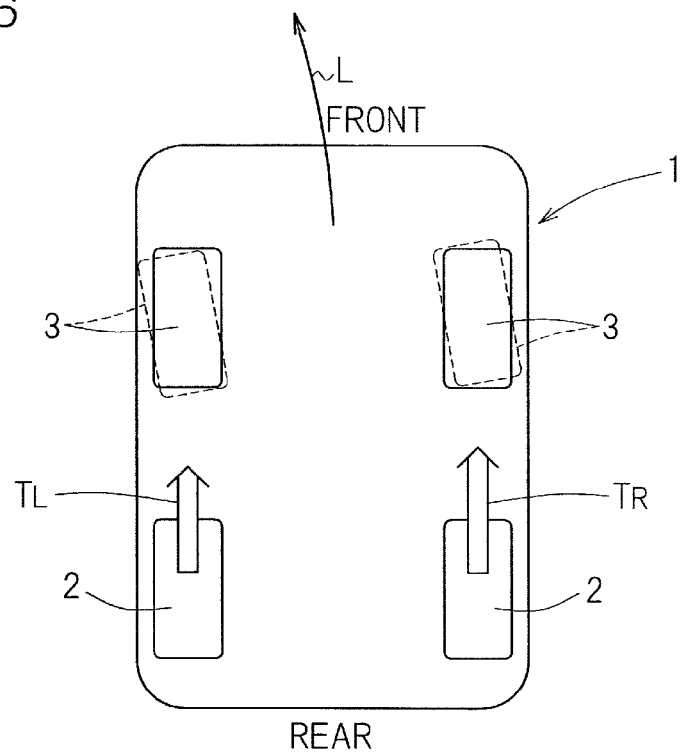
FIG. 6 is a schematic diagram illustrating an operation during straight travelling of the electric vehicle shown in FIG. 1.

Even when the steering angle θs is at a neutral position for intending straight traveling, if a difference has occurred between the driving forces TL, TR of the respective left and right drive wheels 2, a steering torque Ts is transmitted such that the steering wheel 13 rotates due to a load acting on the steered wheels 3, 3 from a road surface, thereby generating the steering torque Ts. For example, as shown in FIG. 6, in the case where the driving force TR of the right drive wheel 2 is greater than the driving force TL of the left drive wheel 2, the vehicle body 1 attempts to turn left as shown by an arrow L. Thus, due to a load from the road surface, the steered wheels 3, 3 attempt to turn so as to follow turning of the vehicle body 1, as shown by broken lines in FIG. 6. The turning force is transmitted via the turning device 10 (FIG. 3) as a steering torque Ts that causes the steering wheel 13 to turn.

Thus, a state where a difference has occurred between the actual driving forces TL, TR of the respective left and right drive wheels 2, 2 can be detected based on the steering angle θs and the steering torque Ts. When the steering angle θs is at the neutral position and the steering torque Ts is low to such a degree that the steering torque Ts can be regarded as zero, it can be determined that no difference has occurred between the driving forces TL, TR. In other words, if the absolute value |Ts| of the steering torque Ts meets:

$|Ts| \leq \epsilon TS,$ it can be determined that no difference has occurred between the driving forces TL, TR.

In addition, even when the steering angle θs is at the neutral position, if a steering torque Ts that is high to some extent is generated, that is, if $|Ts| > \epsilon TS,$ εTS: a threshold based on which it is regarded as being at the neutral position,
it can be determined that TL≠TR.

It is to be noted that during operation of the brakes 16, there are many variations in how the steering torque Ts occurs, and thus the steering torque Ts is not always dependable. As such, automatic adjustment is not preferred.

Therefore, a state where a difference has occurred between the actual driving forces TL, TR of the respective left and right drive wheels 2 even when the same torque command values TL*, TR* are provided, can be determined as appropriate by the torque difference occurrence determiner 31 based on the information of the torque command values TL*, TR* applied to the left and right two traction motor units 6, 6, the braking signal B, the steering angle θs, and the steering torque Ts.

It is to be noted that it is very difficult to directly detect the actual driving forces TL, TR of the respective left and right drive wheels 2 caused by the respective traction motor units 6, 6. Even if a motor current is measured, the actual driving forces TL, TR may deviate depending on the motor output characteristic. When strain of a shaft is detected by a strain sensor or the like, the actual driving forces TL, TR can be detected. However, in terms of wiring or a space for mounting the sensor, it is not practical to provide the strain sensor to the rotational shaft and extract its output. In contrast, the torque difference occurrence determiner 31 determines a driving force difference based on the information of the torque command values TL*, TR*, the braking signal B, the steering angle θs, and the steering torque Ts, and thus can appropriately perform the determination of a driving force difference between the left and right wheels with a simple configuration.

More specifically, for example, as shown in FIG. 4, when the torque difference occurrence determiner 31: has determined that the steering angle θs is at a steering neutral position based on the information of the steering angle θs (step S1); has determined that the same torque command values TL*, TR* are applied from the torque command unit 23 to the left and right two traction motor units 6, 6 (S2); and has determined that the brakes 16 are in a non-actuated state based on the braking signal B (S3), if the steering torque Ts is equal to or higher than the threshold εTS (a value based on which it is determined that a torque difference practically has occurred) (S4), the torque difference occurrence determiner 31 determines that a difference has occurred between the actual driving forces of the respective left and right drive wheels 2 (S5). In other words, when $|\theta s| < \epsilon \theta;$ $|TL^* - T_{R^*}| < \epsilon T;$ and $B = 0$ if $|Ts| \geq \epsilon TS,$ the torque difference occurrence determiner 31 determines that TL≠TR.

As described above, when the steering angle θs is at the steering neutral position and the steering torque Ts is high to some extent, it is in a state where a difference has occurred between the driving forces TL, TR of the respective left and right drive wheels 2. Therefore, by determining that it is in a state where a difference has occurred between the actual driving forces TL, TR of the respective left and right drive wheels 2 if the steering torque Ts at that time is equal to or higher than the threshold εTS, an appropriate determination can be performed.

Figure 5:
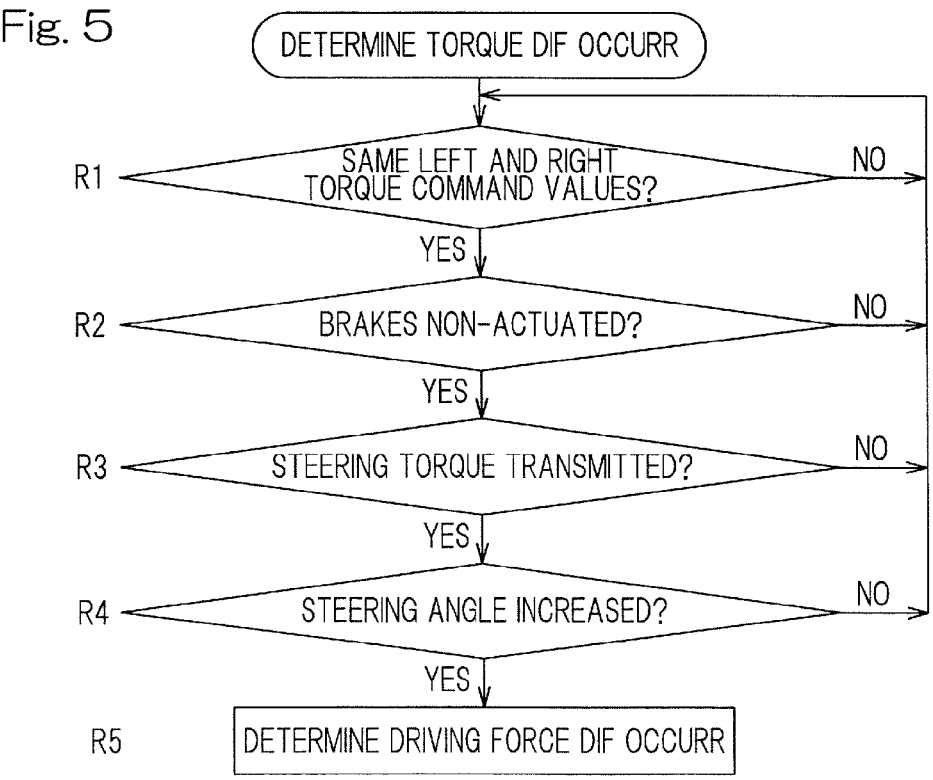
FIG. 5 is a flowchart showing another operation example of the torque difference occurrence determiner in the electric vehicle shown in FIG. 1.

Alternatively, as shown in FIG. 5, when the torque difference occurrence determiner 31 has determined that the same torque command values TL*, TR* are applied from the torque command unit 23 to the left and right two traction motor units 6, 6 (R1); and has determined that the brakes 16 are in a non-actuated state based on the braking signal B (R2), if the torque difference occurrence determiner 31 determines that the steering torque Ts is transmitted such that the steering wheel 13 of the steering device 12 rotates due to a load acting on the wheels 3, 3 from the road surface, based on the steering torque Ts detected by the steering torque detector 19 (R3); and determines that the steering angle θs is increased from the steering neutral position (R4), the torque difference occurrence determiner 31 may determine that a difference has occurred between the actual driving forces TL, TR of the respective left and right drive wheels 2, 2 (R5).

If a difference has occurred between the actual driving forces TL, TR of the respective left and right drive wheels 2, the steering torque Ts is transmitted due to a load acting on the wheels 3, 3 from the road surface and the steering angle θs is increased from the steering neutral position. Thus, also by the torque difference occurrence determiner 31 determining that a difference has occurred between the actual driving forces TL, TR of the respective left and right drive wheels 2 if the torque difference occurrence determiner 31 determines that the steering torque Ts is transmitted and determines that the steering angle θs is increased from the steering neutral position, an appropriate determination can be performed.

The steering torque detector 19 is configured to determine the steering torque Ts by converting the current of the turning motor 14 in the embodiments, and thus can detect the steering torque Ts with a simple configuration. In other words, when the steering angle θs is at the neutral position, if a driving force difference has occurred between the left and right drive wheels 2, the torque of the turning motor 14 is increased due to a load acting on the wheels 3, 3 from the road surface. The torque of the turning motor 14 can be obtained from the current thereof. As a result, the information of the steering torque Ts is obtained by converting the current in the turning motor 14, and thus the information of the steering torque Ts can be obtained with a simple configuration in which an ammeter and a converter are merely provided.

As described above, the alarm unit 33 may output an alarm giving notice to the driver if: the torque difference occurrence determiner 31 determines that a difference has occurred between the actual driving forces TL, TR of the respective left and right drive wheels 2 even when the same torque command values TL*, TR* are applied to the two traction motor units 6, 6; and the driving force difference is equal to or greater than the threshold. The threshold is a value higher than the threshold εTS based on which it is determined whether a driving force difference has occurred. If a difference has occurred between the driving forces TL, TR of the two traction motor units 6, 6 during straight travelling, and the difference is great, there is the possibility that some kind of a problem has occurred, and it is preferred to perform maintenance such as re-adjustment, repair, replacement, or the like of the traction motor units 6, 6 or a motor drive circuitry even when appropriate travelling is enabled under control of the driving force difference reducer 32 at the moment. When an alarm is outputted by the alarm unit 33, the driver is allowed to know the problem and to perform maintenance early.

Figure 7:
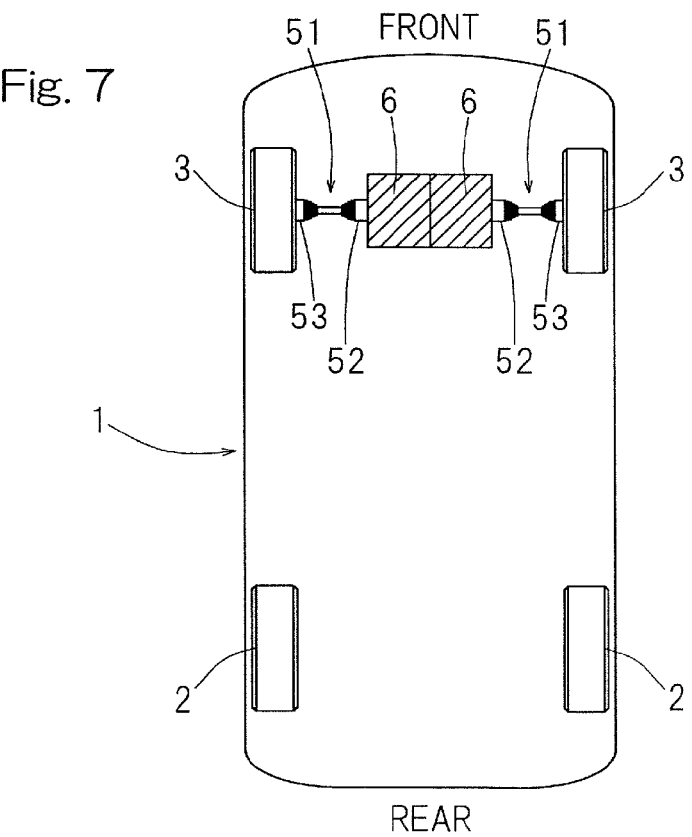
FIG. 7 is a plan view showing a drive system of an electric vehicle according to another embodiment.

It is to be noted that each above embodiment has been described with the case of the electric vehicle in which each traction motor unit 6 forms a part of the in-wheel motor drive system 8, but the present invention may be applied to, for example, an on-board type electric vehicle shown in FIG. 7. In the electric vehicle in FIG. 7, the traction motor units 6, 6 may be mounted in the vehicle body 1, and a drive therefrom may be transmitted to the drive wheels 2 via respective drive transmission members 51. Each drive transmission member 51 may include an assembly component in which two constant velocity universal joints 52, 53 are provided at both ends of a drive shaft. In addition, the electric vehicle according to the present invention may include not only a four-wheel vehicle, but also a three-wheel vehicle. The drive wheels 2, 2 may be front wheels or rear wheels.

REFERENCE SIGNS

1 . . . vehicle body
2 . . . drive wheel
3 . . . wheel (steered wheel)
4 . . . wheel bearing unit
6 . . . traction motor unit
7 . . . reducer unit
8 . . . in-wheel motor drive system
10 . . . turning device
12 . . . steering device
13 . . . steering wheel
14 . . . turning motor
15 . . . steering angle detector
16 . . . brake
19 . . . steering torque detector
21 . . . ECU
22 . . . inverter unit (motor driver)
23 . . . torque command unit
31 . . . torque difference occurrence determiner
32 . . . driving force difference reducer
33 . . . alarm unit
TL, TR . . . driving force
TL*, TR* . . . torque command value
θs . . . steering angle
Ts . . . steering torque

What is claimed is:

1. A four-wheel or three-wheel electric vehicle comprising:
two traction motor units configured to independently drive left and right drive wheels, respectively;
a torque command unit configured to output torque command values for driving the two traction motor units, respectively;
a motor driver configured to drive the respective traction motor units in accordance with the torque command values provided by the torque command unit;
a torque difference occurrence determiner configured to determine that a difference has occurred between actual driving forces of the respective left and right drive wheels even when the torque command unit applies the same torque command values to the two traction motor units; and
a driving force difference reducer configured to, if the torque difference occurrence determiner determines that a driving force difference equal to or greater than a set value has occurred between the left and right drive wheels, cause control of reducing the driving force difference to be performed during travelling of the vehicle.

2. The electric vehicle as claimed in claim 1, further comprising:
a steering angle detector configured to detect a steering angle of a steering device; and
a steering torque detector configured to detect a steering torque applied to the steering device,
wherein the torque difference occurrence determiner determines that a difference has occurred between the actual driving forces of the respective left and right drive wheels even when the same torque command values are applied, based on information of the torque command values applied from the torque command unit to the two traction motor units, a braking signal actuating a brake, the steering angle, and the steering torque.

3. The electric vehicle as claimed in claim 2, wherein when the torque difference occurrence determiner has determined that the same torque command values are applied from the torque command unit to the two traction motor units; has determined that the brake is in a non-actuated state based on the braking signal; and has determined that the steering angle is at a steering neutral position based on the information of the steering angle, if the steering torque is equal to or higher than a threshold, the torque difference occurrence determiner determines that a difference has occurred between the actual driving forces of the respective left and right drive wheels.

4. The electric vehicle as claimed in claim 2, wherein when the torque difference occurrence determiner has determined that the same torque command values are applied from the torque command unit to the two traction motor units; and has determined that the brake is in a non-actuated state based on the braking signal, if the torque difference occurrence determiner determines that the steering torque is transmitted such that a steering wheel of the steering device rotates due to a load acting on wheels from a road surface, based on the steering torque detected by the steering torque detector; and determines that the steering angle is increased from a steering neutral position, the torque difference occurrence determiner determines that a difference has occurred between the actual driving forces of the respective left and right drive wheels.

5. The electric vehicle as claimed in claim 2, further comprising a turning device configured to be driven or auxiliarily driven by a turning motor,
wherein the steering torque detector obtains the information of the steering torque by converting a current in the turning motor.

6. The electric vehicle as claimed in claim 1, further comprising an alarm unit configured to output an alarm giving notice to a driver if: the torque difference occurrence determiner determines that a difference has occurred between the actual driving forces of the respective left and right drive wheels even when the same torque command values are applied to the two traction motor units; and the driving force difference is equal to or greater than a threshold.

7. The electric vehicle as claimed in claim 1, wherein each traction motor unit is an in-wheel motor.

8. The electric vehicle as claimed in claim 1, wherein each traction motor unit is mounted in a vehicle body, and a drive therefrom is transmitted to the drive wheel via a drive transmission member.

* * * * *